(12) United States Patent
Leclerc et al.

(10) Patent No.: US 10,251,017 B2
(45) Date of Patent: *Apr. 2, 2019

(54) PROXIMITY-BASED CONFIGURATION OF A DEVICE

(71) Applicant: ESKI Inc., Montreal (CA)

(72) Inventors: Vincent Leclerc, Montreal (CA); Vadim Kravtchenko, Montreal (CA); Jean-Sébastien Rousseau, Montreal (CA); Justin Alexandre Francis, Montreal (CA)

(73) Assignee: ESKI Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,163

(22) Filed: Aug. 28, 2017

(65) Prior Publication Data

US 2017/0359684 A1    Dec. 14, 2017

Related U.S. Application Data

(63) Continuation of application No. 15/376,210, filed on Dec. 12, 2016, now Pat. No. 9,788,152, which is a
(Continued)

(51) Int. Cl.
*H04W 4/02* (2018.01)
*H04W 48/14* (2009.01)
(Continued)

(52) U.S. Cl.
CPC ............ *H04W 4/02* (2013.01); *H04W 48/14* (2013.01); *H04W 76/11* (2018.02); *H04W 76/14* (2018.02); *H04W 48/16* (2013.01)

(58) Field of Classification Search
CPC ....... H04W 4/003; H04W 4/14; H04W 68/00; H04W 12/06; H04W 76/025; H04W 4/02;
(Continued)

(56) References Cited

U.S. PATENT DOCUMENTS

| 6,124,862 A | 9/2000 | Boyken et al. |
| 7,203,524 B2 | 4/2007 | Tushinsky et al. |

(Continued)

FOREIGN PATENT DOCUMENTS

| CA | 2901602 A1 | 7/2014 |
| CA | 2919749 A1 | 2/2015 |

(Continued)

OTHER PUBLICATIONS

International Search Report and Written Opinion for Application No. PCT/CA2016/050684 dated Jul. 27, 2016.
(Continued)

*Primary Examiner* — Congvan Tran
(74) *Attorney, Agent, or Firm* — Wolf, Greenfield & Sacks, P.C.

(57) ABSTRACT

Some embodiments of the invention provide techniques which enable a mobile computing device to seamlessly configure an auxiliary device without a user having to provide input to an application or other component(s) executing on the mobile computing device to select the auxiliary device for configuration. The mobile computing device may determine, in the absence of such input, whether the auxiliary device is in sufficiently close physical proximity to the mobile computing device for the mobile computing device to configure the auxiliary device. If so, configuration of the auxiliary device may proceed automatically, or may be performed semi-automatically or manually by the user of the mobile computing device.

30 Claims, 6 Drawing Sheets

Related U.S. Application Data continuation of application No. PCT/CA2016/050778, filed on Jul. 4, 2016.

(60) Provisional application No. 62/316,683, filed on Apr. 1, 2016.

(51) Int. Cl.
  *H04W 76/14* (2018.01)
  *H04W 76/11* (2018.01)
  *H04W 48/16* (2009.01)

(58) Field of Classification Search
  CPC . H04W 24/02; H04W 76/021; H04W 76/023; H04B 1/3816
  USPC ......... 340/539.1, 539.11, 539.13; 455/404.2, 455/456.1, 428, 466, 3.01, 3.04, 525, 558, 455/41.1, 41.2, 420
  See application file for complete search history.

(56) References Cited

U.S. PATENT DOCUMENTS

| | | |
|---|---|---|
| 7,798,404 B2 | 9/2010 | Gelbman |
| 8,477,035 B2 | 7/2013 | Goldman et al. |
| 8,502,480 B1 | 8/2013 | Gerszberg et al. |
| 8,628,198 B2 | 1/2014 | Jalbout et al. |
| 8,648,541 B2 | 2/2014 | Gerszberg et al. |
| 8,660,369 B2 | 2/2014 | Llano et al. |
| 8,740,391 B2 | 6/2014 | Leclerc et al. |
| 8,798,926 B2 | 8/2014 | Stroila et al. |
| 8,941,332 B2 | 1/2015 | Gerszberg |
| 8,947,226 B2 | 2/2015 | Dugan |
| 8,956,303 B2 | 2/2015 | Hong et al. |
| 9,066,383 B2 | 6/2015 | Gerszberg |
| 9,288,836 B1 | 3/2016 | Clement et al. |
| 9,474,137 B1 | 10/2016 | Wein |
| 9,686,843 B2 | 6/2017 | Van De Sluis et al. |
| 9,722,649 B2 | 8/2017 | Leclerc et al. |
| 9,788,152 B1 | 10/2017 | Leclerc et al. |
| 9,813,091 B2 | 11/2017 | Leclerc et al. |
| 9,813,857 B2 | 11/2017 | Leclerc et al. |
| 2002/0199198 A1 | 12/2002 | Stonedahl |
| 2003/0013459 A1 | 1/2003 | Rankin et al. |
| 2003/0014330 A1 | 1/2003 | Showghi et al. |
| 2005/0093976 A1 | 5/2005 | Valleriano et al. |
| 2006/0173701 A1 | 8/2006 | Gurvey |
| 2007/0144047 A1 | 6/2007 | Singh |
| 2009/0032586 A1 | 2/2009 | Hunt |
| 2009/0270743 A1 | 10/2009 | Dugan et al. |
| 2010/0013918 A1 | 1/2010 | Ta'Ead |
| 2010/0085279 A1 | 4/2010 | Repko |
| 2010/0285283 A1 | 11/2010 | Kingsbury |
| 2010/0309000 A1 | 12/2010 | Munthe-Kaas et al. |
| 2011/0256886 A1 | 10/2011 | Velusamy |
| 2011/0260830 A1 | 10/2011 | Weising |
| 2011/0276396 A1 | 11/2011 | Rathod |
| 2012/0072420 A1 | 3/2012 | Moganti et al. |
| 2012/0233158 A1 | 9/2012 | Braginsky et al. |
| 2012/0313759 A1 | 12/2012 | Markwitz et al. |
| 2013/0046542 A1 | 2/2013 | Papakipos et al. |
| 2013/0176142 A1 | 7/2013 | Drysdale et al. |
| 2013/0185750 A1 | 7/2013 | Ayoub |
| 2013/0231760 A1 | 9/2013 | Rosen et al. |
| 2013/0254137 A1 | 9/2013 | Hunt |
| 2013/0262298 A1 | 10/2013 | Morley |
| 2013/0280682 A1 | 10/2013 | Levine et al. |
| 2013/0286223 A1 | 10/2013 | Latta et al. |
| 2013/0325887 A1 | 12/2013 | Takaoka |
| 2014/0132181 A1 | 5/2014 | Gerszberg |
| 2014/0172980 A1 | 6/2014 | Russell |
| 2014/0184386 A1 | 7/2014 | Regler et al. |
| 2014/0205155 A1 | 7/2014 | Chung et al. |
| 2014/0236769 A1 | 8/2014 | Drake et al. |
| 2014/0270681 A1 | 9/2014 | Sen et al. |
| 2014/0344062 A1 | 11/2014 | Lamont |
| 2015/0012308 A1 | 1/2015 | Snyder |
| 2015/0031294 A1 | 1/2015 | Holman et al. |
| 2015/0145655 A1 | 5/2015 | Slupik |
| 2015/0145656 A1 | 5/2015 | Levesque et al. |
| 2015/0178532 A1 | 6/2015 | Brule |
| 2015/0187206 A1 | 7/2015 | Saurin et al. |
| 2015/0189056 A1 | 7/2015 | Magi |
| 2015/0222517 A1 | 8/2015 | McLaughlin et al. |
| 2015/0281009 A1 | 10/2015 | Melcher et al. |
| 2015/0302310 A1 | 10/2015 | Wernevi et al. |
| 2015/0334772 A1 | 11/2015 | Wong et al. |
| 2015/0341903 A1 | 11/2015 | Jeong et al. |
| 2015/0381793 A1 | 12/2015 | Cerda et al. |
| 2016/0007925 A1 | 1/2016 | Mirov et al. |
| 2016/0042364 A1 | 2/2016 | Zamer et al. |
| 2016/0071541 A1 | 3/2016 | Miner |
| 2016/0174857 A1 | 6/2016 | Eggers et al. |
| 2016/0192193 A1 | 6/2016 | Lee |
| 2016/0205358 A1 | 7/2016 | Dickinson |
| 2016/0247145 A1 | 8/2016 | Grimaux |
| 2016/0255068 A1 | 9/2016 | Pritchard et al. |
| 2016/0292511 A1 | 10/2016 | Ayalasomayajula et al. |
| 2016/0316542 A1 | 10/2016 | Wein |
| 2016/0381488 A1 | 12/2016 | Kreitzer et al. |
| 2017/0004685 A1 | 1/2017 | Karsten |
| 2017/0006414 A1 | 1/2017 | Tomassini et al. |
| 2017/0010664 A1 | 1/2017 | Tanaka et al. |
| 2017/0048951 A1 | 2/2017 | Huang et al. |
| 2017/0091205 A1 | 3/2017 | Leclerc et al. |
| 2017/0093447 A1 | 3/2017 | Leclerc et al. |
| 2017/0094459 A1 | 3/2017 | Leclerc et al. |
| 2017/0288711 A1 | 10/2017 | Leclerc et al. |
| 2017/0289751 A1 | 10/2017 | Leclerc et al. |
| 2018/0034489 A1 | 2/2018 | Leclerc et al. |
| 2018/0035252 A1 | 2/2018 | Leclerc et al. |
| 2018/0232384 A1 | 8/2018 | Leclerc et al. |

FOREIGN PATENT DOCUMENTS

| | | |
|---|---|---|
| CN | 103975374 A | 8/2014 |
| CN | 104205785 A | 12/2014 |
| CN | 204215355 U | 3/2015 |
| CN | 104679234 A | 6/2015 |
| CN | 104065818 A | 9/2015 |
| WO | WO 2006/100513 A1 | 9/2006 |
| WO | WO 2014/100519 A1 | 6/2014 |
| WO | WO 2014/143997 A1 | 9/2014 |
| WO | WO 2014/182161 A2 | 11/2014 |

OTHER PUBLICATIONS

International Search Report and Written Opinion for Application No. PCT/CA2016/050688 dated Aug. 19, 2016.
International Search Report and Written Opinion for Application No. PCT/CA2016/050778 dated Sep. 12, 2016.
International Search Report and Written Opinion for Application No. PCT/CA2016/050718 dated Sep. 23, 2016.
International Preliminary Report on Patentability for Application No. PCT/CA2016/050718 dated Nov. 30, 2017.
International Preliminary Report on Patentability for Application No. PCT/CA2016/050688 dated Jan. 9, 2018.
International Preliminary Report on Patentability for Application No. PCT/CA2016/050684 dated Feb. 15, 2018.
International Preliminary Report on Patentability dated Oct. 11, 2018 in connection with International Application No. PCT/CA2016/050778.
Chinese Office Action dated Jan. 4, 2019, in connection with Chinese Application No. 201680058316.3.

PROXIMITY-BASED CONFIGURATION OF A DEVICE

RELATED APPLICATIONS

This application is a continuation of U.S. patent application Ser. No. 15/376,210, filed Dec. 12, 2016, entitled "Proximity-Based Configuration Of A Device," which is a continuation of International Application No. PCT/CA2016/050778, filed Jul. 4, 2016, entitled "Proximity-Based Configuration Of A Device," which claims priority to U.S. Provisional Application Ser. No. 62/316,683, filed Apr. 1, 2016, entitled "Proximity-Based Configuration Of A Device". The entirety of each of the applications referenced above is incorporated herein by reference.

BACKGROUND

Technologies exist which allow the user of a mobile computing device to send information wirelessly to an auxiliary device. For example, a user of a smartphone may configure the features of a smart watch by sending information via Bluetooth, send payment information to a payment terminal via use near field communication (NFC), or choose a song to play on a wireless speaker at a specified volume by sending information over a Wi-Fi network.

SUMMARY

The Assignee has appreciated that conventional techniques for sending information wirelessly from a mobile computing device to an auxiliary device require the user to provide input to an application or other component(s) executing on the mobile computing device to select the auxiliary device (such as to initiate a pairing procedure), or don't allow the user of the mobile computing device to configure the auxiliary device's manner of operation, or both. The Assignee has further appreciated that an ability to seamlessly and frictionlessly configure an auxiliary device without forcing users of mobile computing devices to undergo a pairing procedure or otherwise provide such selection input to an application or other component executing on the mobile computing device would be advantageous for a number of reasons. For example, not forcing users to undergo a pairing procedure or otherwise provide input to an application or other component to select an auxiliary device would enable the auxiliary device to be configured faster and more easily than conventional techniques allow, would allow configuration to be accomplished in situations in which requiring the user to provide such selection input is undesirable or impracticable, and would allow users to configure multiple auxiliary devices simultaneously or in quick succession.

Accordingly, some embodiments of the invention provide techniques which allow the user of a mobile computing device to seamlessly configure the operation of an auxiliary device. In some embodiments, an ability to configure an auxiliary device is predicated on physical proximity between the mobile computing device and the auxiliary device. As such, some embodiments of the invention provide techniques whereby a mobile computing device may determine, in the absence of user input to an application or other component executing on the mobile computing device to select the auxiliary device, whether the auxiliary device is in sufficiently close proximity for the mobile computing device for the auxiliary device to be configured. Some embodiments of the invention provide techniques whereby an auxiliary device may provide information to a mobile computing device which the mobile computing device may use to determine, in the absence of any user input selecting the auxiliary device, whether the auxiliary device is in sufficiently close proximity to the mobile computing device to be configured by the mobile computing device. Configuration of the auxiliary device may be automatic, semi-automatic and/or manual, and the manner in which configuration is performed may depend on any number of considerations.

Some embodiments of the invention are directed to a method for use by an auxiliary device. The method comprises acts of: (A) the auxiliary device receiving from a mobile computing device a transmission; (B) the auxiliary device sending, in response to receiving the transmission: (1) information usable by the mobile computing device to determine, in the absence of any user input to an application or other component(s) executing on the mobile computing device, whether the auxiliary device is in sufficiently close proximity to the mobile computing device for the mobile computing device to configure the auxiliary device, and (2) information identifying at least one feature, characteristic and/or operation of the auxiliary device that is configurable by the mobile computing device; and (C) the auxiliary device receiving from the mobile computing device information usable by the auxiliary device to configure at least one feature, characteristic and/or operation of the auxiliary device.

Other embodiments of the invention are directed to a method for use by a mobile computing device. The method comprises acts of: (A) the mobile computing device receiving a transmission from an auxiliary device; (B) the mobile computing device determining, in the absence of any user input to an application or other component(s) executing on the mobile computing device, whether the auxiliary device is in sufficiently close proximity to the mobile computing device for the mobile computing device to configure the auxiliary device; and (C) if it is determined in the act (B) that the auxiliary device is in sufficiently close proximity to the mobile computing device for the mobile computing device to configure the auxiliary device, the mobile computing device configuring at least one feature, characteristic and/or operation of the auxiliary device.

Other embodiments of the invention are directed to an auxiliary device, comprising: at least one communication component, configured to receive from a mobile computing device a transmission; and at least one processor, programmed to cause the at least one communication component to send to the mobile computing device, in response to receiving the transmission: (1) information usable by the mobile computing device to determine, in the absence of any user input to an application or other component(s) executing on the mobile computing device, whether the auxiliary device is in sufficiently close proximity to the mobile computing device for the mobile computing device to configure the auxiliary device, and (2) information identifying at least one feature, characteristic and/or operation of the auxiliary device that is configurable by the mobile computing device; wherein the at least one communication component is further configured to receive from the mobile computing device information usable by the auxiliary device to configure at least one feature, characteristic and/or operation of the auxiliary device.

Other embodiments of the invention are directed to a mobile computing device, comprising: at least one communication component, configured to receive a transmission from an auxiliary device; and at least one processor, configured to: determine, in the absence of any user input to any application or other component executing on the mobile computing device, whether the auxiliary device is in sufficiently close proximity to the mobile computing device for the mobile computing device to configure the auxiliary device; and if it is determined that the auxiliary device is in sufficiently close proximity to the mobile computing device for the mobile computing device to configure the auxiliary device, cause the at least one communication component to issue instructions to the auxiliary device for configuring at least one feature, characteristic and/or operation of the auxiliary device.

The foregoing is intended as a brief, non-limiting overview of only some aspects of the invention. A more detailed description of some embodiments of the invention is provided in the sections that follow.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DESCRIPTION

Some embodiments of the invention provide techniques which enable the user of a mobile computing device to seamlessly and frictionlessly configure an auxiliary device without having to undergo a procedure to pair the mobile computing device and auxiliary device, or otherwise provide input to an application or other component(s) executing on the mobile computing device to select the auxiliary device for configuration. For example, some embodiments of the invention provide a capability to configure an auxiliary device which is based at least in part upon the mobile computing device being in sufficiently close physical proximity to the auxiliary device. For example, in some embodiments, a mobile computing device may determine, in the absence of any user input to an application or other component(s) executing on the mobile computing device which selects the auxiliary device, whether the auxiliary device is in sufficiently close physical proximity to the mobile computing device to be configured by the mobile computing device. This determination may be based, at least in part, on information included in, or ascertainable via, one or more transmissions sent by the auxiliary device to the mobile computing device. Configuration of the auxiliary device may, for example, proceed automatically in response to a determination that the auxiliary device is sufficiently proximate to the mobile computing device, or may be performed semi-automatically, or manually by the user of the mobile computing device. In some embodiments, if semi-automatic or manual configuration is to be performed, the auxiliary device may provide information to the mobile computing device that describes the features, characteristics and/or operations of the auxiliary device that are configurable, and the mobile computing device may employ this information to present a configuration interface to the user.

Figure 1:
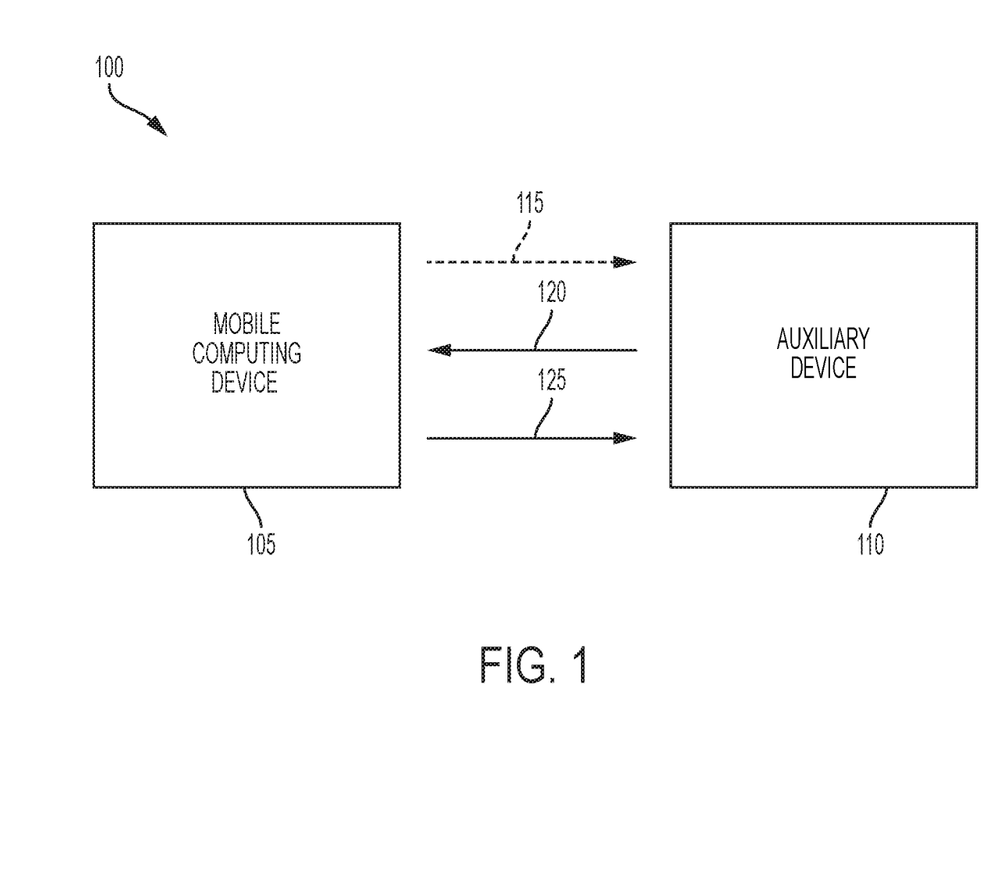
FIG. 1 is a block diagram depicting components of a representative system enabling proximity-based configuration of an auxiliary device, in accordance with some embodiments of the invention.

FIG. 1 depicts a representative system 100 for performing proximity-based configuration of an auxiliary device 110. Representative system 100 includes mobile computing device 105, which may comprise any suitable device(s) and/or component(s) suitable for mobile computing. Suitable mobile computing devices 105 include, but are not limited to, mobile telephones (e.g., smartphones), tablet computers, media players, smartwatches, portable gaming consoles, and navigation devices. In some embodiments, a suitable mobile computing device 105 may include one or more microprocessors, one or more communication components such as a transmitter, receiver and/or transceiver, a screen for displaying information to a user, and/or a facility for receiving input (which may be provided in any suitable form, including touch, voice, gesture, eye contact, and/or other input form(s)). As discussed further below, a mobile computing device 105 may execute one or more applications for performing various configuration tasks.

Auxiliary device 110 may comprise any suitable device having one or more configurable features, characteristics and/or operations. (Although the label "auxiliary" is used herein to designate device 110, it should be appreciated that this label does not impose any limitation whatsoever on the type, nature, capabilities or form factor of device 110. For example, the functionality provided by device 110 need not be "auxiliary" in the sense that it supplements or augments functionality provided by any other device(s). Rather, this label is used merely to lend clarity and readability to the description herein.) For example, in some embodiments, auxiliary device 110 may comprise a wearable device (e.g., a wristband, hat, necklace, badge, medal, eyeglasses, goggles, ball, and/or other wearable implement) which is adapted to express a state (e.g., produce a visual animation, such as through a change in color, light intensity, opacity, or other light characteristics; render video or an image; produce sound; change shape; produce an odor, etc.) in response to a stimulus. One example of a wearable device which is adapted to express a state in response to a stimulus is described in commonly assigned U.S. Pat. No. 8,740,391, entitled "Devices And Methods For Providing A Distributed Manifestation In An Environment," the entirety of which is incorporated herein by reference. However, it should be appreciated that auxiliary device 110 need not comprise a wearable device, and need not be adapted to express a state in response to a stimulus. Rather, an auxiliary device 110 may comprise any suitable implement(s) having one or more configurable features, characteristics and/or operations, and in this respect, an auxiliary device 110 may include one or more microprocessors, communication components such as a transmitter, receiver and/or transceiver, and/or a facility for receiving user input. It should be appreciated, however, that not all auxiliary devices 110 may include all such components. As described further below, any of numerous features, characteristics and/or operations of an auxiliary device 110 may be configured, including but not limited to functional modes, privacy filters, ownership characteristics, physical aspects, and/or other aspects.

In representative system 100, proximity-based configuration of auxiliary device 110 is initiated and performed via wireless transmission of information between mobile computing device 105 and auxiliary device 110. That is, mobile computing device 105 may receive one or more wireless transmissions from auxiliary device 110, and may perform processing on information which is included in, or ascertainable via, the transmission(s) to determine whether the mobile computing device 105 is sufficiently close to auxiliary device 110 to configure one or more features, characteristics and/or operations of auxiliary device 110. For example, in some embodiments, a mobile computing device 105 may determine whether or not an auxiliary device 110 is in sufficiently close proximity to be configured based at least in part on various characteristics of wireless transmissions received from the auxiliary device 110.

In embodiments of the invention which employ wireless transmissions to initiate and/or perform proximity-based configuration of an auxiliary device, any suitable communication medium(s) and/or protocol(s), whether now known or later developed, may be used for these wireless transmissions. Suitable communications media include, but are not limited to, infrared, visible light, radio frequencies, and ultra-wideband energy forms. Suitable communications protocols include, but are not limited to, versions and/or variations of Bluetooth, NFC, Wi-Fi and Li-Fi. It should be appreciated, however, that not all embodiments of the invention may employ wireless transmissions to initiate and/or perform proximity-based configuration of an auxiliary device 110. In embodiments of the invention which do not employ wireless transmissions, a mobile computing device may use any suitable technique(s) to determine whether it is sufficiently close to an auxiliary device to configure it. For example, some embodiments may employ capacitive techniques to determine whether a mobile computing device is sufficiently close to an auxiliary device to configure the auxiliary device. It should be appreciated, however, that if such alternative techniques are used to make an initial determination as to proximity between the mobile computing device and auxiliary device, any suitable technique(s) may thereafter be used to communicate information so as to configuration of the auxiliary device, including wireless transmissions and/or other techniques.

In the representative system shown in FIG. 1, wireless communication between mobile computing device 105 and auxiliary device 110 is represented by transmissions which are labeled 115, 120 and 125. In the system shown, transmission 115 from mobile computing device 105 to auxiliary device 110 is optional, as indicated by the dotted line in FIG. 1. In this respect, in some embodiments of the invention, a mobile computing device 105 may "discover" the presence of an auxiliary device 110 by transmitting a message to auxiliary devices in its vicinity which requests that recipients respond with a transmission of their own. However, in some embodiments of the invention, a mobile computing device 105 may not send such a transmission 115. Instead, an auxiliary device 110 may send transmissions (e.g., based upon one or more criteria being satisfied, such as according to a predefined schedule) to announce its presence to nearby mobile computing devices 105. Of course, the embodiments in which a mobile computing device 105 discovers the presence of auxiliary devices 110 and those in which an auxiliary device announces its presence to mobile computing devices are not mutually exclusive, as both types of transmissions may be employed in certain configurations.

Whether or not the transmission 120 is sent in response to a transmission 115, transmission 120 may supply information which mobile computing device 105 can use to determine whether the auxiliary device 110 is in sufficiently close physical proximity to be configured. This determination may be made in any of numerous ways, using any of numerous types of information and techniques. In some embodiments, mobile computing device 105 may determine whether or not auxiliary device 110 is in sufficiently close physical proximity based at least in part upon one or more characteristics of transmission 120, such as the strength of transmission 120 when it was received. The strength of a transmission may be assessed in any of numerous ways, using any of numerous different measures and techniques. In one example, the "flight time" or "trip time" of transmission 120 between auxiliary device 110 and mobile computing device 105 may be used to approximate a distance between auxiliary device 110 and mobile computing device 105. This flight or trip time may be measured using any of various types of information, which may or may not be included in transmission 120 itself, depending on the communication technique(s) employed. In another example, the strength of the transmission may be assessed based on a received signal strength indication (RSSI). In yet another example, a link quality indicator may be used to assess the strength of the transmission. The strength of a transmission may be evaluated based on information indicating a strength at which it was transmitted, a strength at which it was received, or both. This information may, for example, be compared to one or more threshold values, which may be predefined, dynamically determined, or both, and/or evaluated in any other suitable fashion to assess the strength of transmission 120.

It should be appreciated that a mobile computing device 105 need not base a determination whether an auxiliary device is in sufficiently close proximity on the strength of a received transmission, as any suitable information may be used to make this determination. For example, as noted above, information generated by a capacitive device (e.g., a charge-coupled array) may be used to assess the physical proximity of an auxiliary device.

In the example shown in FIG. 1, transmission 125 is sent by mobile computing device 105 to auxiliary device 110 when it is determined that auxiliary device 110 is in sufficiently close proximity for it to be configured. As noted above, configuration of auxiliary device 110 may be automatic, semi-automatic or manual, and so the nature of the information included in transmission 125 may depend at least in part on the manner in which configuration is to be performed. For example, if the configuration of auxiliary device 110 is to be automatic, then transmission 125 may comprise information (e.g., instructions, parameters, values, etc.) usable by auxiliary device 110 to modify one or more of its features, characteristics and/or operations. If the configuration of auxiliary device 110 is to be semi-automatic or manual, then transmission 125 may be part of a more extensive exchange of information between the mobile computing device 105 and the auxiliary device 110, during which the auxiliary device 110 may specify to mobile computing device 105 the features, characteristics and/or operations which are configurable and how each may be configured, and mobile computing device 105 may process this information to present a display to a user which enables the user to specify, at least in part, how one or more of the features, characteristics and/or operations are to be configured. Some representative ways in which an auxiliary device 110 may be configured are described in further detail below.

It should be appreciated that the transmissions from a mobile computing device 105 may be directed to auxiliary device 110 in any suitable fashion. For example, in some embodiments, a mobile computing device 105 may employ an identifier for the auxiliary device 110, such as a media access control (MAC) address, network address, and/or other identifier(s) characterizing the auxiliary device 110, to direct a transmission (e.g., transmission 125) to the auxiliary device. Such identifier(s) may, for example, be provided to mobile computing device 105 by auxiliary device 110 in transmission 120. Any suitable technique(s) may be employed.

It should also be appreciated that in the representative system shown in FIG. 1, mobile computing device 105 is capable of determining whether auxiliary device 110 is in sufficiently close proximity to be configured in the absence of any user input to an application or other component(s) executing on the mobile computing device 105 to select the auxiliary device 110 for configuration. As a result of this capability, a user need not undergo any cumbersome and time-consuming procedure (e.g., a pairing procedure) to initiate communication with and configuration of the auxiliary device. Rather, this communication and configuration may be commenced seamlessly, and so configuration may be completed faster and more easily than conventional techniques allow, and/or in situations in which having a user supply input to complete pairing is undesirable or impracticable (e.g., in situations where the user is giving attention to other tasks, or is otherwise engaged).

Figure 2:
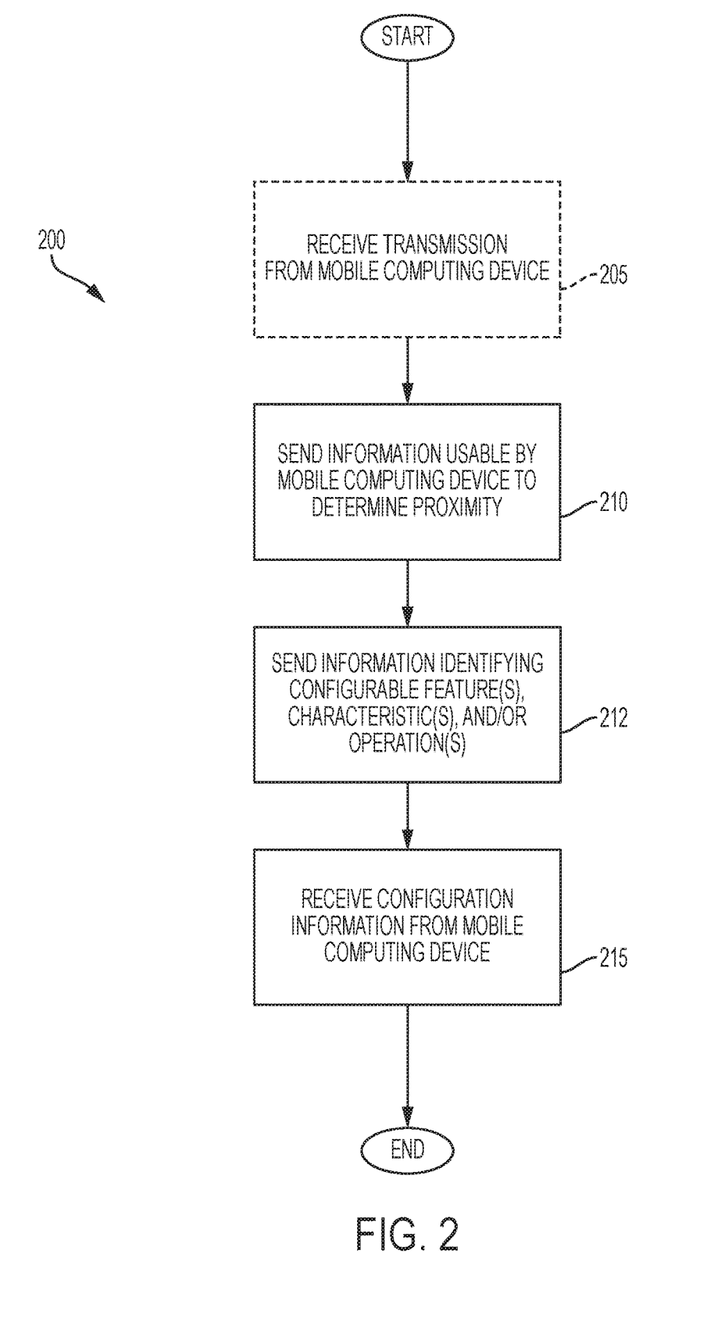
FIG. 2 is a flowchart depicting a representative process which may be performed by an auxiliary device to enable proximity-based configuration, in accordance with some embodiments of the invention.
Figure 3:
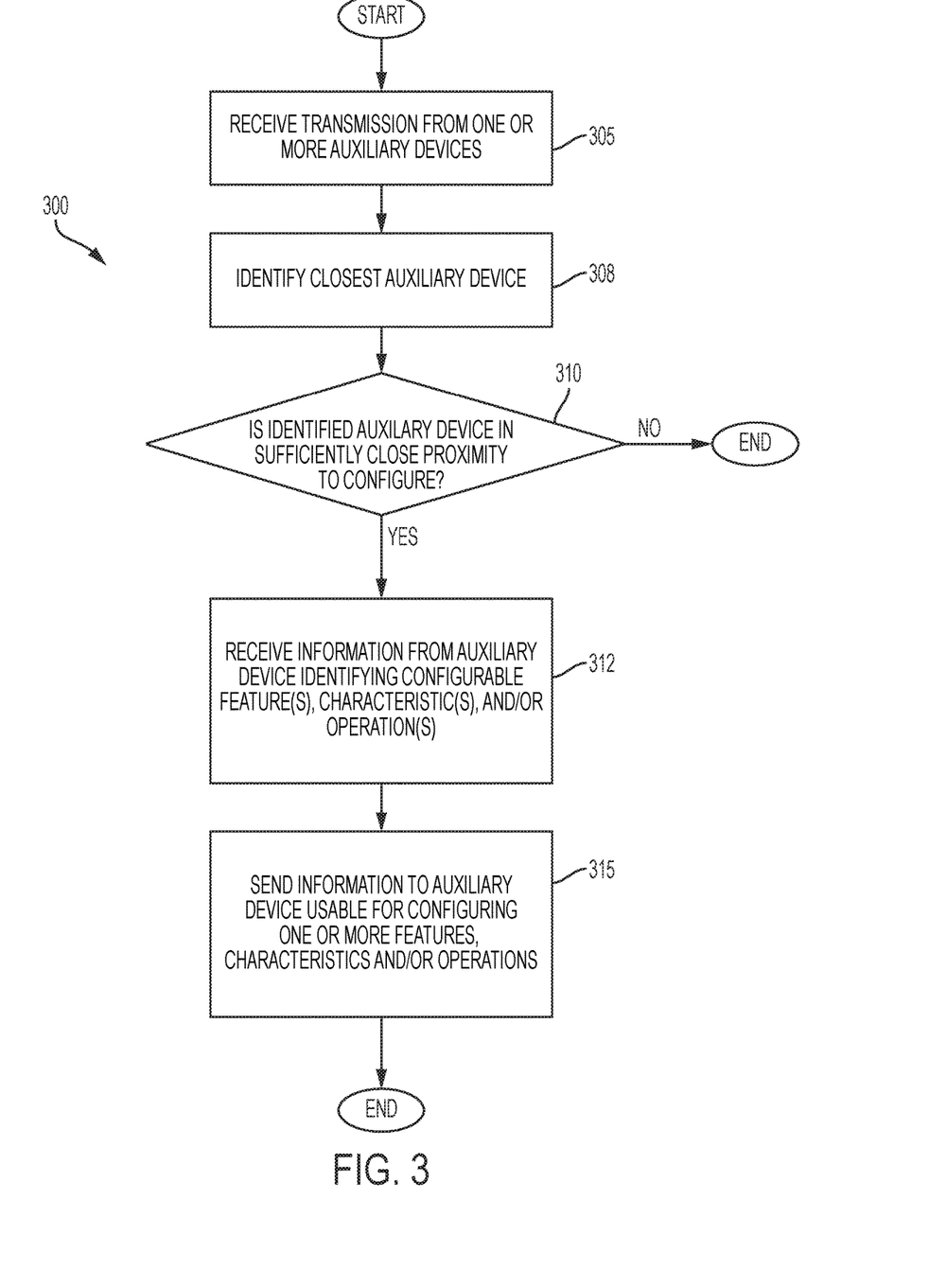
FIG. 3 is a flowchart depicting a representative process which may be performed by a mobile computing device to facilitate proximity-based configuration of an auxiliary device, in accordance with some embodiments of the invention.

FIGS. 2 and 3 depict in greater detail representative processing which may be performed by auxiliary device 110 and mobile computing device 105 in performing the proximity-based configuration shown in FIG. 1. Specifically, FIG. 2 depicts a representative process 200 which may be performed by an auxiliary device 110 to enable it to be configured by a mobile computing device 105 in sufficiently close proximity, and FIG. 3 depicts a representative process 300 whereby a mobile computing device 105 may perform proximity-based configuration of a particular auxiliary device 110.

At the start of representative process 200 (FIG. 2), an auxiliary device 110 receives a transmission from a mobile computing device 105 (as depicted in FIG. 1 at 115). As discussed above with reference to FIG. 1, in some embodiments this transmission from the mobile computing device is optional, and so act 205 is depicted in FIG. 2 using dotted lines. If act 205 is performed, a transmission having any suitable characteristics may be sent in any suitable way to auxiliary device 110.

Representative process 200 then proceeds to act 210, wherein the auxiliary device 110 sends a transmission to the mobile computing device 105, either in response to a transmission received in act 205 (if one was received), or without having previously received any communication from the mobile computing device 105 (e.g., in response to pre-defined criteria being satisfied, such as criteria defining a scheme of periodic transmissions by the auxiliary device 110). This transmission by auxiliary device 110 in act 210 may comprise any suitable information, may employ any suitable communications protocol(s) and/or infrastructure, and may have any suitable characteristics, as the invention is not limited in this respect. In some embodiments of the invention, the transmission sent by auxiliary device 110 in act 210 may supply information which is usable by the mobile computing device 105 to determine whether the auxiliary device 110 is in sufficiently close proximity to be configured by the mobile computing device 105, as described above with reference to FIG. 1.

For the purpose of this description, assume that the mobile computing device 105 determines that the auxiliary device 110 is in sufficiently close proximity to be configured by the mobile computing device 105. As such, representative process 200 proceeds to act 212, wherein the auxiliary device 110 sends a transmission to the mobile computing device which identifies the feature(s), characteristic(s) and/or operation(s) of the auxiliary device 110 which the mobile computing device 105 may configure, and how each may be configured. Configurable features, characteristics and/or operations of the auxiliary device, and the manner of potential configuration for each, may be identified in any suitable fashion. In this respect, as noted above, configuration of the auxiliary device may be automatic, semi-automatic or manual. For features, characteristics and/or operations which are to be automatically configured, then, the transmission sent in the act 212 may, for example, identify these features, characteristics and/or operations using parameters, and provide possible values for each, so that a value for one or more of the parameters may be provided by the mobile computing device 105 (e.g., as the output of logical processing). For features, characteristics and/or operations which are to be configured semi-automatically or manually, the transmission sent in the act 212 may, in some embodiments, comprise information which is analogous to the content of a web page, so that the mobile computing device may process the information to present a display of configurable features, characteristics and/or operations to a user.

The configurable features, characteristics and/or operations of the auxiliary device, and the manner(s) in which each may be configured, may be represented in the transmission sent in the act 212 in any of numerous ways, and the content comprising this representation may be formatted using any suitable protocol(s) and/or language(s). For example, some embodiments of the invention may employ one or more markup languages (e.g., HTML, XML, markdown, etc.) to represent the configurable aspects of an auxiliary device. Some embodiments may employ JavaScript Object Notation (JSON) or other data formats which are useful for lightweight information interchange.

The representation in the transmission sent in the act 212 may take any of numerous forms. For example, in some embodiments, content which is supplied by an auxiliary device may be compressed or otherwise "stripped down" to accommodate memory and/or resource limitations of the mobile computing device 105. In some embodiments, a representation may not entirely identify all of the configurable features, characteristics and/or operations of an auxiliary device 110, and/or may not entirely identify the ways in which such features, characteristics and/or operations may be configured. For example, a representation sent in the transmission sent in the act 212 may include one or more pointers, links or other references which an application executing on a mobile computing device 105 may employ to obtain information on configurable features, characteristics and/or operations of an auxiliary device 110. For example, in some embodiments, the transmission sent in the act 212 may include one or more URLs, URIs or other references which an application executing on a mobile computing device 105 may use to retrieve information relating to the configuration of an auxiliary device 110.

Some embodiments of the invention may use cascading style sheets (CSS) and/or other tools or techniques to specify in transmission 210 the manner in which information is presented by a mobile computing device 105, and such tools or techniques may determine, at least in part, how information is displayed by the mobile computing device. For example, in some embodiments, information may be displayed by the mobile computing device in such a way as to allow the user to click on buttons, drag sliders, enter text, and/or interact with any other suitable graphical user interface control(s) to provide configuration input. These controls may be specified, at least in part, in transmission 212.

A user's configuration input may be processed in various ways. For example, in some embodiments, user input received via controls presented by a mobile computing device 105 may immediately be sent to an auxiliary device 110 for processing, and the mobile computing device may refresh the entire representation in response to sending the information (e.g., by re-downloading content from the auxiliary device 110). In other embodiments, a mobile computing device may employ asynchronous technology (e.g., Asynchronous JavaScript and XML, or AJAX) to update only certain portions of the configuration interface display. If logical processing logic is to be performed on configuration input, JavaScript or other scripting languages may, for example, be employed to accommodate such processing. It can be seen, then, that some embodiments of the invention may employ a client-server model in which an application executing on the mobile computing device may be viewed as the "client" and the auxiliary device may be viewed as the "server," and the auxiliary device may use similar content delivery tools and techniques as those which are used to provide content to clients in conventional client-server (e.g., web) architectures.

It should be appreciated that in some embodiments of the invention, all of the features, characteristics and/or operations of an auxiliary device may not be configured in the same manner. For example, one or more features of a particular auxiliary device may be configured automatically by a mobile computing device, while others may be configured semi-automatically, and others may be configured manually. Any suitable combination of configuration techniques may be employed, as the invention is not limited in this respect.

It should also be appreciated that a mobile computing device 105 need not have previously interacted with (e.g., configured) an auxiliary device 110 to configure the auxiliary device at a particular point in time. In this respect, some embodiments of the invention may employ an architectural pattern like a model-view-controller (MVC) model to govern information transfer relating to the configuration of various features, characteristics and/or operations of the auxiliary device, to enable a mobile computing device to configure any of numerous different types of auxiliary devices. A configuration application executing on a mobile computing device may, in some embodiments, enable a user to interact with and configure a wide range of devices, instead of using a different configuration application for each type of auxiliary device. As such, in some embodiments of the invention, transmissions which are sent by different types of auxiliary devices in act 210 may share certain characteristics (e.g., standard formats, certain data, etc.) to facilitate device-agnostic configuration by a mobile computing device.

Returning to FIG. 2, at the completion of the act 212, representative process 200 proceeds to act 215, wherein the auxiliary device 110 receives information from the mobile computing device 105 relating to configuration of one or more of its features, characteristics and/or operations. This may be performed in any of numerous ways. For example, in some embodiments, information received from the mobile computing device 105 may comprise instructions which include a representational state transfer (REST) command (e.g., including one or more GET, POST, PUT, or DELETE functions), a Create, Read, Update and Delete (CRUD) function command, a file system to which data has been written, a specification of a file system stored on the auxiliary device 110 to which certain specified data is to be written, and/or any other suitable information relating to configuration of the auxiliary device.

At the completion of act 215, representative process 200 completes.

As noted above, FIG. 3 depicts a representative process 300 whereby a mobile computing device may perform proximity-based configuration of an auxiliary device. As a result, representative process 300 comprises acts which may in some embodiments be complementary to those described above in relation to representative process 200 (FIG. 2).

Representative process 300 begins in act 305, in which a mobile computing device 105 receives a transmission from one or more auxiliary devices 110. The transmission(s) may, for example, be received in response to a prior transmission by the mobile computing device 105 (e.g., as an attempt to discover the auxiliary devices in the vicinity). Alternatively, the transmission(s) may be sent by auxiliary device(s) 110 in response to one or more predefined criteria (e.g., criteria defining a transmission schedule by each auxiliary device, defining circumstances under which transmission is to be performed, etc.) being satisfied.

In the representative process shown in FIG. 3, the mobile computing device 105 then determines which of the auxiliary devices from which a transmission was received in the act 305 is closest to the mobile computing device in act 308. It should be appreciated, however, that a mobile computing device 105 may select a particular auxiliary device with which to continue communication based on any of numerous criteria, which may or may not include determining which auxiliary device 110 is closest to the mobile computing device 105. For example, act 308 may involve the mobile computing device 105 selecting a particular auxiliary device 110 with which to continue communication based upon the type of device, information included in the transmission received from the device, etc. Representative process 300 then proceeds to act 310, in which the mobile computing device 105 determines whether the auxiliary device which is identified in the act 308 is sufficiently close to the mobile computing device to be configured by the mobile computing device in the act 310.

The determinations in acts 308 and 310 which relate to evaluating the physical proximity between the mobile computing device 105 and the auxiliary device 110 may be performed in any of numerous ways, and may be based on any suitable information. For example, in some embodiments of the invention, either or both of these determinations may be based at least in part on information which was included in the transmission(s) received in the act 305, and/or based at least in part on one or more characteristics of the transmission(s) received in the act 305. For example, the auxiliary device 110 which is closest to the mobile computing device 105 may be identified based at least in part upon the strength of the transmission received from this auxiliary device in the act 305 relative to the strength of the transmission(s) received from one or more other auxiliary devices. The strength of the transmission from the auxiliary device that is determined to be closest to the mobile computing device may then also be used in the act 310 to assess whether the auxiliary device is sufficiently close to the mobile computing device for the mobile computing device to configure the auxiliary device 110.

In the process shown in FIG. 3, if it is determined in the act 310 that the auxiliary device 110 is not in sufficiently close proximity to be configured, then the process ends. However, if it is determined in the act 310 that the identified auxiliary device 110 is sufficiently close to the mobile computing device be configured by the mobile computing device 105, then representative process 300 proceeds to act 312, wherein the mobile computing device 105 receives from the auxiliary device information which identifies the features, characteristics and/or operations of the auxiliary device 110 which the mobile computing device 105 may configure, and how each may be configured. As described above with reference to act 212 in representative process 200 (FIG. 2), the configurable features, characteristics and/or operations of the auxiliary device, and the manner in which each may be configured, may be represented in the transmission received in the act 312 in any of numerous ways, and the content comprising the representation may be formatted using any suitable protocol(s) and/or language(s).

Representative process 300 then proceeds to act 315, wherein the mobile computing device sends information to auxiliary device 110 that is usable by the auxiliary device to configure one or more of its features, characteristics and/or operations. As noted above, this information may, for example, be directed to the auxiliary device using an identifier for the auxiliary device, such as its MAC address, a network address, and/or some other identifier(s). As is also noted above, for the features, characteristics and/or operations of the auxiliary device which are automatically configurable, the information sent in act 315 may comprise various parameters and one or more values for each parameter. For features, characteristics and/or operations which are semi-automatically or manually configurable, the information sent in act 315 may comprise a response to representation sent by the auxiliary device. This response may, for example, be generated by a configuration application executing on the mobile computing device 105 which presents a configuration interface to a user.

In some embodiments, the automatic configuration of a feature, characteristic and/or operation of an auxiliary device may follow a pre-programmed setting, or a setting which results from logical processing by the mobile computing device. For example, in some embodiments, a user may configure a feature, characteristic and/or operation of an auxiliary device in a predefined way simply by bringing the mobile computing device to within sufficiently close proximity of the auxiliary device. For example, a mobile computing device may configure an auxiliary device in a predefined way merely by coming into contact with the auxiliary device. In some embodiments, a user may toggle between settings for a particular feature, characteristic and/or operation by bringing the mobile computing device to within sufficiently close proximity of the auxiliary device. For example, a particular feature of an auxiliary device may be activated through a first touch with a mobile computing device, deactivated with a second touch, reactivated with a third touch, and so on.

In some embodiments, the manner in which a feature, characteristic and/or operation is automatically configured may be influenced by external information. For example, a mobile computing device may automatically configure a feature of an auxiliary device based upon one or more external stimuli and/or device states.

In some embodiments, semi-automatic or manual configuration may be dynamically enabled in response to the mobile computing device coming within sufficiently close proximity to the auxiliary device. For example, bringing the mobile computing device sufficiently close to the auxiliary device may cause a configuration application on the mobile computing device to automatically launch and/or open without any overt user action, so that the user may then supply input to configure the auxiliary device. Moving the mobile computing device away from the auxiliary device may, for example, then cause the configuration application to close.

In some embodiments, after a mobile computing device has configured a particular auxiliary device once, it may thereafter configure the same auxiliary device without performing all of the acts described above with reference to FIG. 3. For example, once a mobile computing device communicates with a particular auxiliary device in a first configuration process and "learns" the ways in which the auxiliary device may be configured, it may thereafter configure the auxiliary device without having to get from the auxiliary device information on its configurable feature(s), characteristic(s) and/or operation(s). Instead, it can skip this step (designated as act 312 in the process 300 described above) and proceed directly to the step of sending information which is usable by the auxiliary device to configure one or more of its features, characteristics and/or operations (designated as act 315 in process 300).

In this respect, it should be appreciated that the processes described herein are intended to be merely illustrative, and that any of numerous variations on these processes may be employed without departing from the spirit and scope of the invention. For example, one or more such variations may include acts which are different than those described herein, may not include all of the acts described herein, and/or may involve the acts being performed in a different sequence than is described herein.

Figure 4:
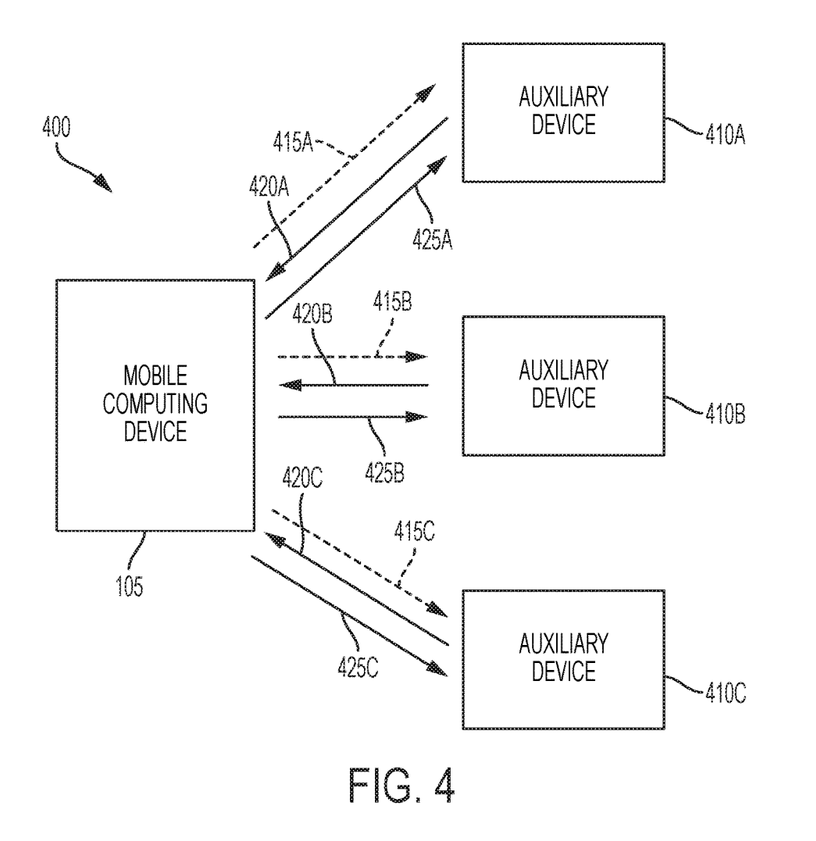
FIG. 4 is a block diagram depicting a representative technique whereby a mobile computing device may perform proximity-based configuration of multiple auxiliary devices, in accordance with some embodiments of the invention.

FIG. 4 depicts a representative system 400 in which a mobile computing device 105 may perform proximity-based configuration of multiple auxiliary devices 410 by communicating with each auxiliary device individually. In the example shown, the mobile computing device 105 configures auxiliary devices 410A, 410B and 410C, although it should be understood that any suitable number of auxiliary devices 410 may be configured. Also in the example shown in FIG. 4, the mobile computing device 105 configures one or more specific features, characteristics and/or operations of each auxiliary device 410 at about the same time in the same way. It should be understood, however, that in other implementations, each auxiliary device 410 may be configured differently (e.g., according to user input supplied to a configuration application executing on the mobile computing device 105, based on logical processing performed by a configuration application executing on the mobile computing device, etc.) and/or at different times (e.g., in a predefined or dynamically determined sequence). For example, after the mobile computing device 105 configures auxiliary device 410A in a particular way, it may then proceed to discover and configure one or more of auxiliary devices 410B and 410C, in the same way that auxiliary device 410A was configured, or a different way.

In some embodiments, a mobile computing device 105 may be able to use a "copy and paste" function to configure multiple proximate auxiliary devices 410 in the same way. For example, a configuration application executing on the mobile computing device 105 may, once a particular auxiliary device 410 has been configured in a particular way, enable the user to specify that this configuration is to be copied and applied to one or more other devices. For example, the application may automatically identify all of the auxiliary devices which are in sufficiently close proximity, and then configure those devices in a specified way, or prompt the user to select certain auxiliary devices 410 in the vicinity for configuration from among those which were discovered.

Figure 5:
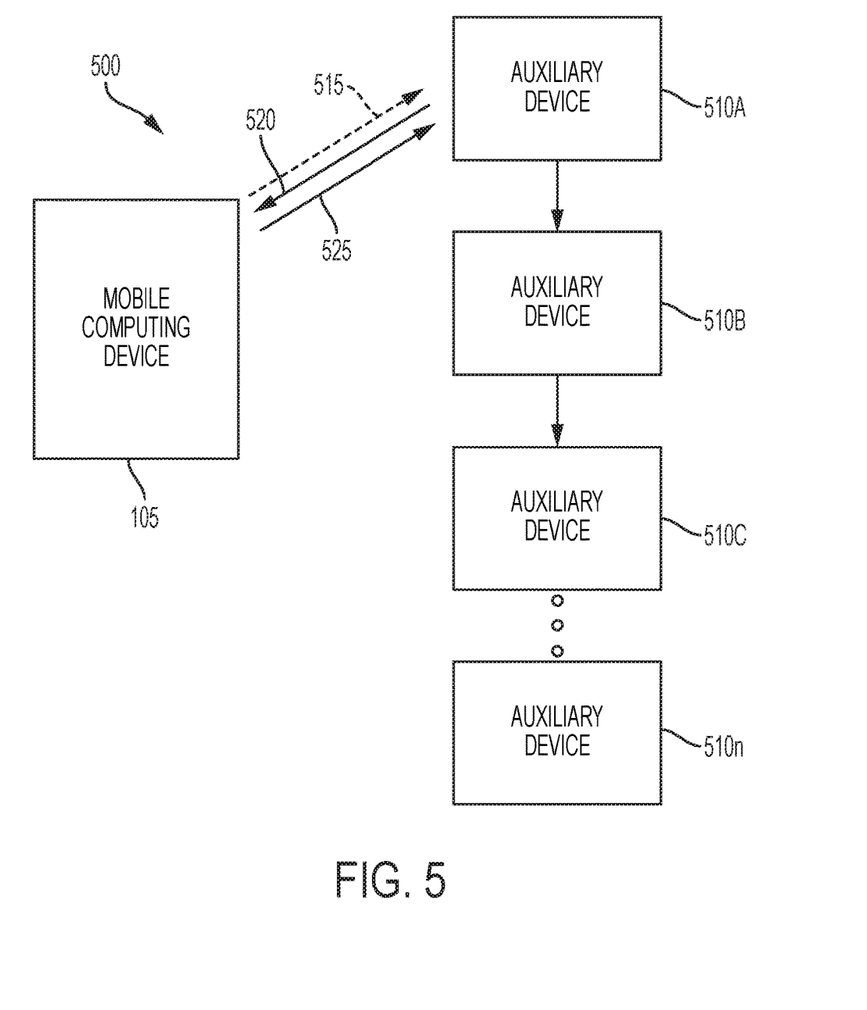
FIG. 5 is a block diagram depicting a representative technique whereby a mobile computing device may perform proximity-based configuration of multiple auxiliary devices, in accordance with some embodiments of the invention.

FIG. 5 depicts a representative system 500 in which a mobile computing device 105 may perform proximity-based configuration of multiple auxiliary devices 510 by communicating with only one of the auxiliary devices, and instructing that auxiliary device to pass along configuration information to other auxiliary devices. In this respect, it should be appreciated that the information which a mobile computing device 105 may send to an auxiliary device 510 is not limited to data that is usable by the auxiliary device to configure specific features, characteristics and/or operations, but that it may also program the auxiliary device to function in a manner similar to the mobile computing device in configuring other auxiliary devices. As such, in FIG. 5, mobile computing device 105 sends information to auxiliary device 510A which equips auxiliary device 510A to configure auxiliary device 510B. In configuring auxiliary device 510B, auxiliary device 510A may provide information to auxiliary device 510B which equips it to configure auxiliary device 510C, and so on. Any suitable number of auxiliary devices may be configured in this fashion, as FIG. 5 indicates. As such, some embodiments of the invention may enable a large number of auxiliary devices to be configured, in "daisy chain" fashion, in a short period of time.

It should be appreciated that the functionality described above may have numerous uses. For example, this functionality may be employed to enable a mobile computing device to configure an auxiliary device's physical aspects (e.g., the manner in which the auxiliary device manifests a state in response to a stimulus), functional modes (e.g., to define when and how those functional modes are invoked), privacy filters (e.g., to define who may configure and/or identify the device), ownership (e.g., to identify the device's owner(s)), credentials, and/or the manner in which the auxiliary device pairs with one or more other devices. It should be appreciated that enabling this type of configuration of an auxiliary device, without having to manipulate any tags, knobs or buttons, user interfaces, etc., on the auxiliary device to do so, provides significant flexibility with regard to the form factor of the auxiliary device, increasing the number and types of devices that may be used for specific applications. It should also be appreciated that being able to configure information such as identifiers, credentials, etc., without the auxiliary device displaying the information improves the privacy associated with the information.

Using the functionality described herein, the user of a mobile computing device may configure various traits of an auxiliary device, in an intuitive manner, simply by bringing the mobile computing device within sufficiently close proximity of the auxiliary device. For example, by pointing a mobile computing device at an auxiliary device, touching the mobile computing device to the auxiliary device, etc., the auxiliary device may be configured quickly and unobtrusively, without requiring the user to devote significant attention to the configuration task. This is in contrast to conventional approaches, in which a user may need to open an application executing on the mobile device, select a particular auxiliary device for configuration via the application, specify the manner in which the selected auxiliary device is to be configured, etc. Some embodiments of the invention enable the auxiliary device to be configured seamlessly, with minimal effort and attention on the user's part, and without exposing the user unnecessarily to configuration details.

It should be appreciated as well that the techniques described herein may be used to perform tasks which may not include configuring an auxiliary device. For example, in some embodiments, these techniques may be used to allow a mobile computing device to obtain any of numerous types of information from an auxiliary device, by bringing the mobile computing device to within sufficiently close proximity to the auxiliary device. The ability to collect information from an auxiliary device, without the auxiliary device necessarily having to visibly supply the information or provide controls, interfaces, etc., to obtain it, affords significant flexibility with respect to the form factor of the auxiliary device, and may augment the privacy of the information.

Figure 6:
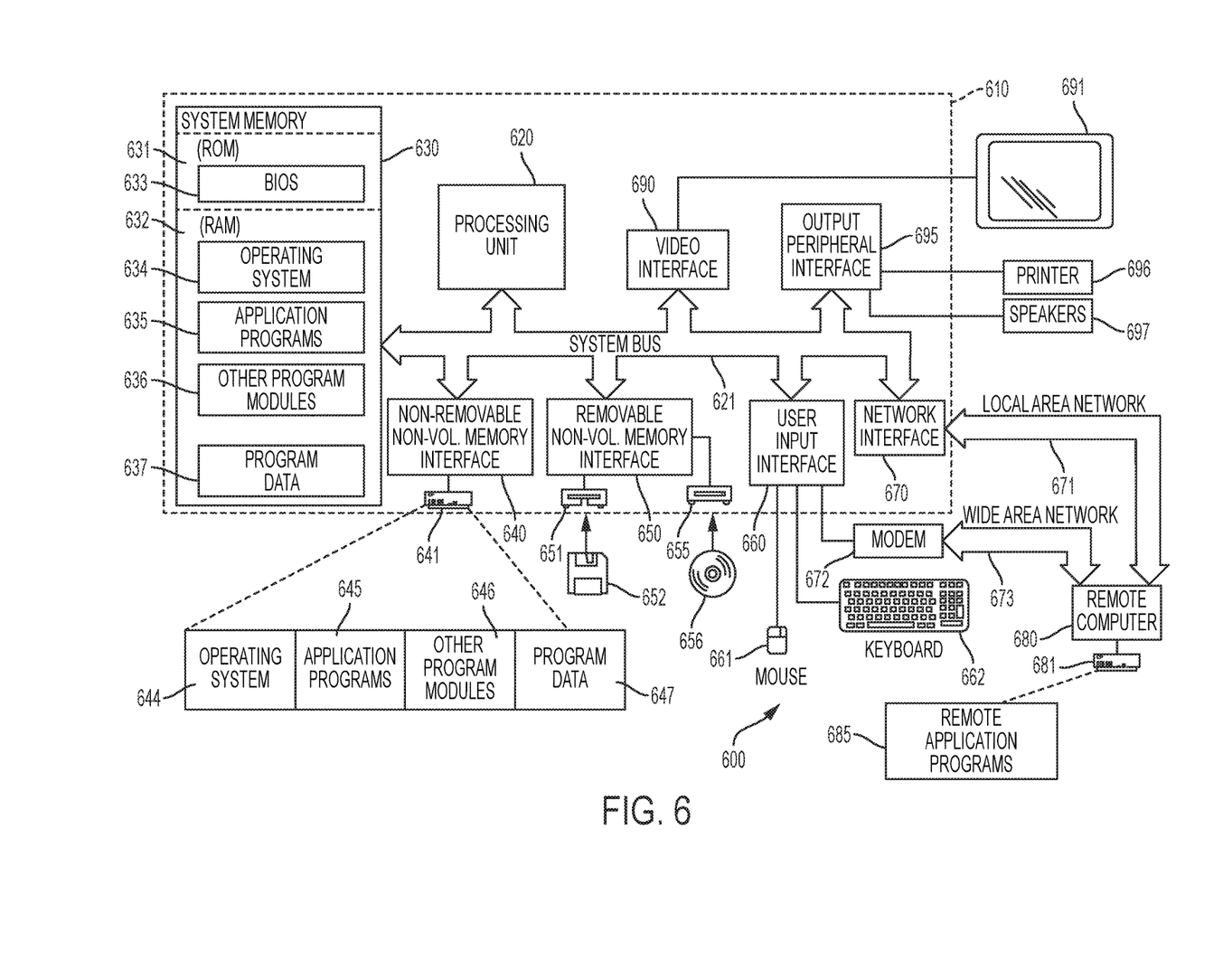
FIG. 6 is a block diagram depicting components of a representative computing system with which certain aspects of the invention may be implemented.

It should be apparent from the foregoing that some embodiments of the invention may employ a computing system. FIG. 6 illustrates one example of a suitable computing system 600 which may be used to implement certain aspects of the invention. The computing system 600 is only one example of a suitable computing system, and is not intended to suggest any limitation as to the scope of use or functionality of the invention. Neither should the computing system 600 be interpreted as having any dependency or requirement relating to any one or combination of components illustrated in the exemplary computing system 600. In this respect, embodiments of the invention are operational with numerous other general purpose or special purpose computing systems or configurations. Examples of well-known computing systems and/or configurations that may be suitable for use with the invention include, but are not limited to, personal computers, server computers, mobile or laptop devices, multiprocessor systems, microprocessor-based systems, set top boxes, programmable consumer electronics, network PCs, minicomputers, mainframe computers, distributed computing systems that include any of the above systems or devices, and the like.

The computing system may execute computer-executable instructions, such as program modules. Generally, program modules include routines, programs, objects, components, data structures, etc. that perform particular tasks or implement particular abstract data types. The invention may also be practiced in distributed computing systems where tasks are performed by remote processing devices that are linked through a communications network. In a distributed computing system, program modules may be located in both local and remote computer storage media including memory storage devices.

FIG. 6 depicts a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 610. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 536, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 560 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been described. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A wearable device, comprising:
   at least one processor, programmed to process a stimulus from a mobile computing device and to make available to the mobile computing device, in response to the stimulus:
   (1) information usable by the mobile computing device to determine, in the absence of any user input to an application or other component executing on the mobile computing device, whether the wearable device is in sufficiently close proximity to the mobile computing device for the mobile computing device to supply configuration input to the wearable device, and
   (2) information identifying at least one feature, characteristic and/or operation of the wearable device to which configuration input supplied by the mobile computing device relates; and
   wherein the at least one processor is programmed to process any configuration input received from the mobile computing device, the processing relating to producing a change in state of the wearable device, the change in state comprising one or more of an altered visual appearance of the wearable device, the wearable device producing sound, the wearable device rendering an image, the wearable device producing odor, the wearable device changing shape, and the wearable device exhibiting one or more tactile characteristics.

2. The wearable device of claim 1, comprising at least one communication component, wherein the at least one processor is programmed to cause the at least one communication component to send to the mobile computing device a transmission having characteristics usable by the mobile computing device to determine whether the wearable device is in sufficiently close proximity to the mobile computing device for the mobile computing device to supply configuration input to the wearable device.

3. The wearable device of claim 1, comprising at least one communication component, wherein the at least one processor is programmed to cause the at least one communication component to send to the mobile computing device information comprising an identifier for the auxiliary device.

4. The wearable device of claim 1, comprising at least one communication component, wherein the stimulus comprises a transmission from the mobile computing device.

5. The wearable device of claim 4, wherein the at least one processor is programmed to cause the at least one communication component to send to the mobile computing device, in response to receiving the transmission from the mobile computing device, the information usable by the mobile computing device to determine whether the wearable device is in sufficiently close proximity to the mobile computing device for the mobile computing device to supply configuration input to the wearable device, and the information identifying at least one feature, characteristic and/or operation of the wearable device to which configuration input supplied by the mobile computing device relates.

6. The wearable device of claim 1, wherein the stimulus comprises physical contact between the wearable device and the mobile computing device.

7. A mobile computing device, comprising:
   at least one communication component, configured to receive a transmission from a wearable device; and
   at least one processor, programmed to:
   determine, in the absence of any user input to any application or other component executing on the mobile computing device, whether the wearable device is in sufficiently close proximity to the mobile computing device for the mobile computing device to supply configuration input to the wearable device;
   if it is determined that the wearable device is in sufficiently close proximity to the mobile computing device for the mobile computing device to supply configuration input to the wearable device, automatically launch on the mobile computing device a configuration component enabling a user of the mobile computing device to specify at least one feature, characteristic and/or operation of the wearable device to which the configuration input relates, and issue instructions to the wearable device as a result of the user supplying input to the configuration component; and after the configuration component has been automatically launched, if it is determined that the wearable device is no longer in sufficiently close proximity to the mobile computing device for the mobile computing device to supply configuration input to the wearable device, automatically shut down the configuration component.

8. The mobile computing device of claim 7, wherein the at least one processor is programmed to determine whether the wearable device is in sufficiently close proximity to the mobile computing device for the mobile computing device to supply configuration input to the wearable device based at least in part on a strength of the transmission received from the wearable device.

9. The mobile computing device of claim 7, wherein the at least one communication component is configured to receive a transmission from each of a plurality of wearable devices, and the at least one processor is programmed to identify a first wearable device of the plurality of wearable devices as being closest to the mobile computing device, and to determine whether the first wearable device is in sufficiently close proximity to the mobile computing device for the mobile computing device to supply configuration input to the first wearable device.

10. The mobile computing device of claim 9, wherein the at least one processor is programmed to, if it is determined that the first wearable device is in sufficiently close proximity to the mobile computing device for the mobile computing device to supply configuration input to the first wearable device, automatically launch on the mobile computing device a configuration component enabling a user of the mobile computing device to supply configuration input to only the first wearable device.

11. A first device, comprising:
at least one communication component, configured to receive from a second device a transmission; and
at least one processor, programmed to cause the at least one communication component to send to the second device, in response to receiving the transmission:
(1) information usable by the second device to determine, in the absence of any user input to an application or other component executing on the second device, whether the first device is in sufficiently close proximity to the second device for the second device to supply configuration input to the first device, and
(2) information identifying at least one feature, characteristic and/or operation of the first device to which configuration input relates; and
wherein the at least one communication component is further configured to receive configuration input from the second device, and the at least one processor is programmed to process any configuration input received from the second device to produce a change in state of the first device, the change in state comprising one or more of an altered visual appearance of the first device, the first device producing sound, the first device rendering an image, the first device producing odor, the first device changing shape, and the first device exhibiting one or more tactile characteristics.

12. The first device of claim 11, wherein the at least one processor is programmed to cause the at least one communication component to send to the second device information comprising an identifier for the first device.

13. A second device, comprising:
at least one communication component, configured to receive a transmission from a first device; and
at least one processor, programmed to:
determine, in the absence of any user input to any application or other component executing on the second device, whether the first device is in sufficiently close proximity to the second device for the second device to supply configuration input to the first device;
if it is determined that the first device is in sufficiently close proximity to the second device for the second device to supply configuration input to the first device, automatically launch on the second device a configuration component enabling a user of the second device to specify at least one feature, characteristic and/or operation of the first device to which the configuration input relates, and issue instructions to the first device as a result of the user supplying input to the configuration component; and
after the configuration component has been automatically launched, if it is determined that the first device is no longer in sufficiently close proximity to the second device for the second device to supply configuration input to the wearable device, automatically shut down the configuration component.

14. The second device of claim 13, wherein the at least one processor is programmed to determine whether the first device is in sufficiently close proximity to the second device for the second device to supply configuration input to the first device based at least in part on a strength of the transmission received from the first device.

15. The second device of claim 13, wherein the at least one communication component is configured to receive a transmission from each of a plurality of first devices, and the at least one processor is programmed to identify a particular first device as being closest to the second device, and to determine whether the particular first device is in sufficiently close proximity to the second device for the second device to supply configuration input to the particular first device.

16. The second device of claim 15, wherein the at least one processor is programmed to, if it is determined that the particular first device is in sufficiently close proximity to the second device for the second device to supply configuration input to the particular first device, automatically launch on the second device a configuration component enabling a user of the second device to supply configuration input to only the particular first device.

17. A mobile computing device, comprising:
at least one communication component, configured to receive a transmission from each of a plurality of wearable devices; and
at least one processor, programmed to:
identify a first wearable device of the plurality of wearable devices as being in closest proximity to the mobile computing device;
determine, in the absence of any user input to any application or other component executing on the mobile computing device, whether the first wearable device is in sufficiently close proximity to the mobile computing device for the mobile computing device to supply configuration input to the first wearable device; and
if it is determined that the first wearable device is in sufficiently close proximity to the mobile computing device for the mobile computing device to supply configuration input to the first wearable device, cause the at least one communication component to supply configuration input to the first wearable device, the configuration input relating to at least one feature, characteristic and/or operation of the first wearable device.

18. The mobile computing device of claim 17, wherein the at least one processor is programmed to determine whether the wearable device is in sufficiently close proximity to the mobile computing device for the mobile computing device to supply configuration input to the wearable device based at least in part on a strength of the transmission received from the wearable device.

19. The mobile computing device of claim 17, wherein the at least one processor is programmed to, if it is determined that the wearable device is in sufficiently close proximity to the mobile computing device for the mobile computing device to supply configuration input to the wearable device, automatically launch on the mobile computing device a configuration component enabling a user of the mobile computing device to specify at least one feature, characteristic and/or operation of the wearable device to which the configuration input relates, and issue instructions to the wearable device as a result of the user supplying input to the configuration component.

20. The mobile computing device of claim 19, wherein the at least one processor is programmed to, after the configuration component has been automatically launched, and if it is determined that the wearable device is no longer in sufficiently close proximity to the mobile computing device for the mobile computing device to supply configuration input to the wearable device, automatically shut down the configuration component.

21. The wearable device of claim 1, wherein the at least one processor is programmed to make available to the mobile computing device information, other than the information usable by the mobile computing device to determine whether the wearable device is in sufficiently close proximity to the mobile computing device for the mobile computing device to supply configuration input to the wearable device, relating to use of the wearable device by a user.

22. The mobile computing device of claim 7, further comprising a display, wherein:
the at least one communication component is configured to receive from the wearable device a transmission comprising information relating to use of the wearable device by a user of the wearable device; and
the at least one processor is programmed to cause the display to present a representation of the information relating to the use of the wearable device by the user of the wearable device.

23. The first device of claim 11, wherein the at least one processor is programmed to make available to the second device information, other than the information usable by the second device to determine whether the first device is in sufficiently close proximity to the second device for the second device to supply configuration input to the first device, relating to use of the first device by a user.

24. The second device of claim 13, further comprising a display, wherein:
the at least one communication component is configured to receive from the first device a transmission comprising information relating to use of the first device by a user of the first device; and
the at least one processor is programmed to cause the display to present a representation of the information relating to the use of the first device by the user of the first device.

25. The mobile computing device of claim 17, further comprising a display, wherein:
the at least one communication component is configured to receive from the first wearable device a transmission comprising information relating to use of the first wearable device by a user of the first wearable device; and
the at least one processor is programmed to cause the display to present a representation of the information relating to the use of the first wearable device by the user of the first wearable device.

26. A method, performed by a wearable device, the method comprising acts of:
(A) receiving, from a mobile computing device, a transmission;
(B) sending, in response to receiving the transmission:
(1) information usable by the mobile computing device to determine, in the absence of any user input to an application or other component(s) executing on the mobile computing device, whether the wearable device is in sufficiently close proximity to the mobile computing device for the mobile computing device to configure the wearable device, and
(2) information identifying at least one feature, characteristic and/or operation of the wearable device that is configurable by the mobile computing device;
(C) receiving information from the mobile computing device; and
(D) manifesting a change in state as a result of receiving the information in the act (C), the change in state altering the visual appearance of the wearable device.

27. The method of claim 26, wherein the act (B)(1) comprises sending a transmission having characteristics usable by the mobile computing device to determine whether the wearable device is in sufficiently close proximity to the mobile computing device.

28. The method of claim 26, wherein the act (B)(2) comprises sending information comprising an identifier for the wearable device.

29. A method, performed by a mobile computing device, the method comprising acts of:
(A) receiving a transmission from a wearable device;
(B) determining, in the absence of any user input to an application or other component(s) executing on the mobile computing device, whether the wearable device is in sufficiently close proximity to the mobile computing device for the mobile computing device to configure the wearable device;
(C) if it is determined that the wearable device is in sufficiently close proximity to the mobile computing device for the mobile computing device to configure the wearable device, automatically launching on the mobile computing device a configuration component which enables a user of the mobile computing device to supply input relating to at least one feature, characteristic and/or operation of the wearable device;
(D) issuing instructions to the wearable device as a result of user input to the configuration component; and
(E) if, after issuing the instructions in the act (D), it is determined that the wearable device is no longer in sufficiently close proximity to the mobile computing device for the mobile computing device to configure the wearable device, automatically shutting down the configuration component.

30. The method of claim 29, wherein the act (B) comprises the mobile computing device determining whether the wearable device is in sufficiently close proximity to the mobile computing device for the mobile computing device to configure the wearable device based at least in part on a strength of the transmission received from the wearable device in the act (A).

* * * * *